United States Patent

[11] 3,628,759

[72] Inventors Omar S. Knedlik
2203 Prairie Lane, Coffeyville, Kans. 67337;
Virgil Stouder, Box 635, Independence, Kans. 67301
[21] Appl. No. 32,622
[22] Filed Apr. 28, 1970
[45] Patented Dec. 21, 1971

[54] FISHING ROD HOLDER
1 Claim, 3 Drawing Figs.
[52] U.S. Cl. .................................................. 248/42, 248/291
[51] Int. Cl. ................................................ A01k 97/10
[50] Field of Search ............................................ 248/38–43

[56] References Cited
UNITED STATES PATENTS
3,532,309 10/1970 Reddick ........................ 248/42
2,717,751 9/1955 Kusio ............................ 248/226 R X
2,312,957 3/1943 Cannon ......................... 248/42

Primary Examiner—William H. Schultz
Attorney—Cushman, Darby and Cushman

ABSTRACT: A tubular fishing rod holder is pivotally secured near its rear to a base for pivotal movement about a horizontal axis. The fore end of the holder is propped up by resting on an eccentric cam which may be rotated about a horizontal axis and fixed to determine the normal angle of inclination of the holder. The holder is of greater diameter than the fishing rod handle to be received so the latter cocks in the former to enhance securement.

PATENTED DEC 21 1971 3,628,759
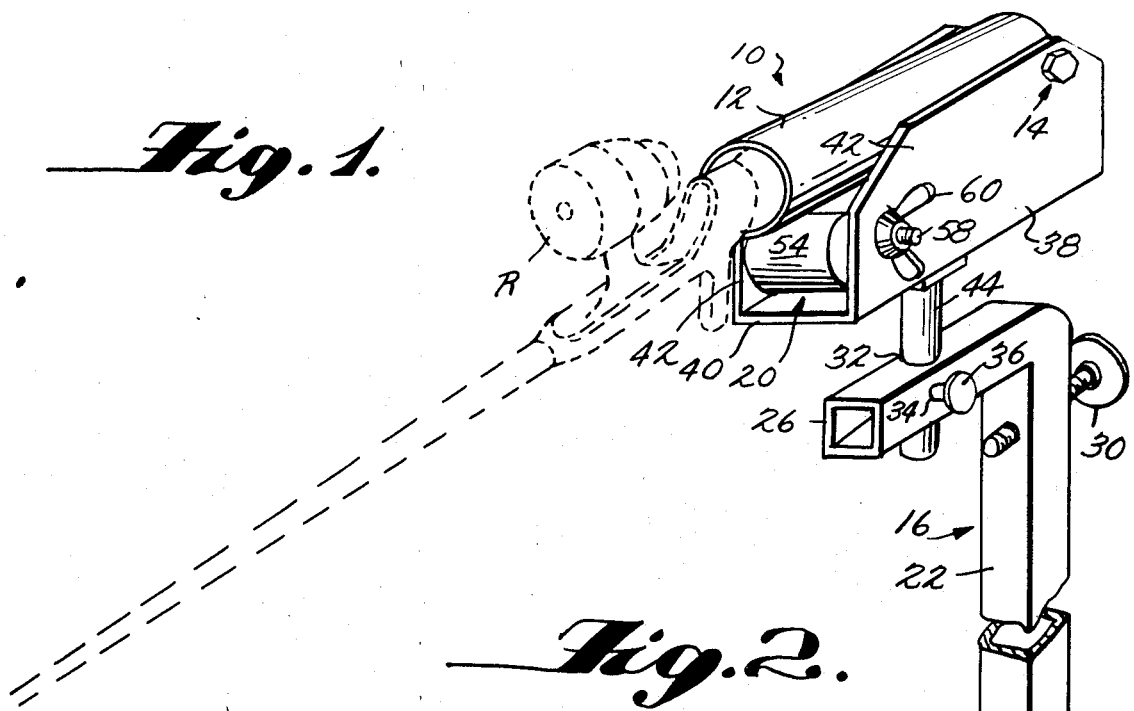
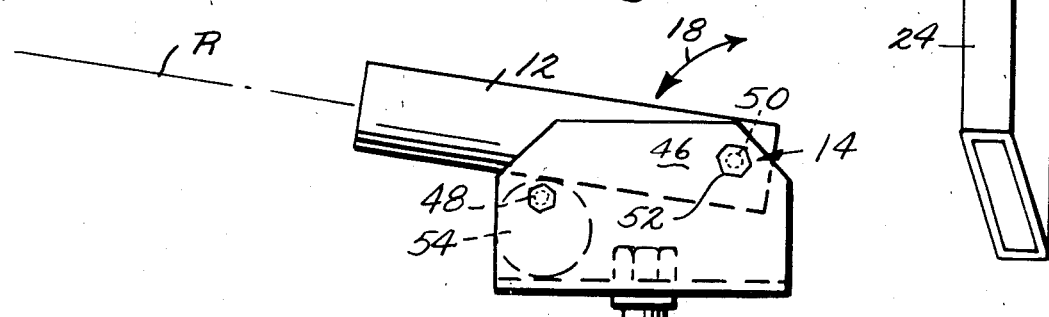
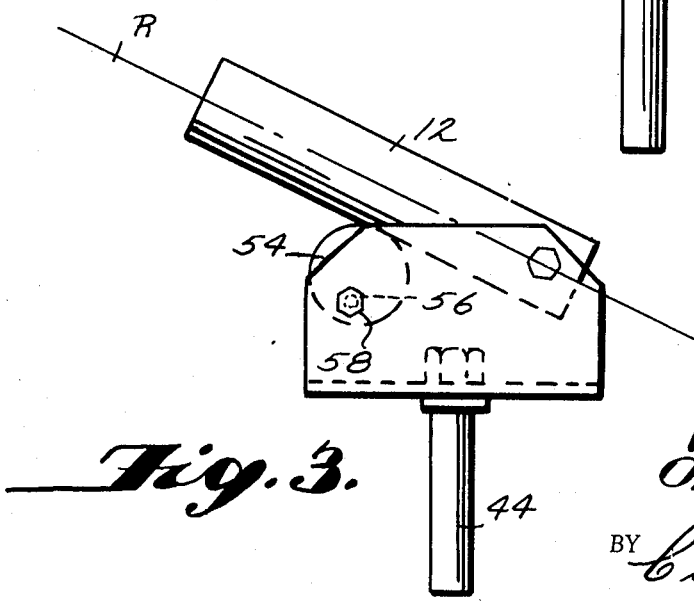
INVENTORS
VIRGIL STOUDER
OMAR S. KNEDLIK
BY Cushman, Darby & Cushman
ATTORNEYS

3,628,759

FISHING ROD HOLDER

BACKGROUND OF THE INVENTION

The prior art includes patents showing inclined, tubular holders for releasably holding fishing rods.

In the instance of the U.S. Pat. of Knight, No. 3,159,366, the cocking of the handle with respect to the tube in which it is received is shown. In this patent, only one operating position for the inclined tube is shown, that being the position achieved when the outer end of the strut 26 is received in the detent 29.

However, adjustability of inclination is shown in the U.S. Pat. of Boesch, No. 2,918,237 and Eklof, No. 3,290,816. In the instance of Boesch, the block 12 may be rotated 180° about its axle 13 (FIG. 3) in order to provide one alternate angle of inclination for the tube 15. In the instance of the Eklof patent, a nut 12' may be adjusted on the threaded shaft 12 in order to change the angle of inclination from about 10° as shown in FIG. 2 to about 60° as shown in FIG. 1.

A similar adjustment is provided at 17 in the U.S. Pat. of Bossert, No. 3,017,149 but in this instance, the rod holder is not tubular.

The Lomar, U.S. Pat. No., 2,652,999 and the Whitlow, U.S. Pat. No. 2,756,954 show inclined, tubular fishing rod holders which are pivotable between a single operating position and a more erect nonuse position.

Valdez, U.S. Pat. No. 2,952,432 and Rogers, U.S. Pat. No. 3,259,346 also show inclined, tubular fishing rod holders. In both instances, there is no apparent provision for changing the angle of inclination.

SUMMARY OF THE INVENTION

In order to provide a fishing rod holder in which the inclined tubular holder may be angularly adjusted in its working position and raised from its working to a nonfishing position with a minimum of structure effort and expense the tubular fishing rod holder is pivotally secured near its rear to a base for pivotal movement about a horizontal axis. The fore end of the holder is propped up by resting on an eccentric cam which may be rotated about a horizontal axis and fixed to determine the normal angle of inclination of the holder. The holder is of greater diameter than the fishing rod handle to be received so the latter cocks in the former to enhance securement.

The principles of the invention will be further hereinafter discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

In the drawing

FIG. 1 is a perspective view of the fishing rod holder, shown holding a fishing rod in position for fishing;

FIG. 2 is a side elevation view of the fishing rod holder of FIG. 1; and

FIG. 3 is a side elevation view of the fishing rod holder showing the eccentric cam adjusted to produce greater inclination of the fishing rod.

DESCRIPTION OF THE PRESENTLY PREFERRED EMBODIMENT

As shown in the Figures, the fishing rod holder device 10 includes a tubular holder 12 pivotally secured at the rear end thereof, by a pivot arrangement 14, to a base 16 so as to be pivotable in the direction of the arrow 18 (FIG. 2) from the fishing position shown, to an elevated, nonfishing position. An eccentric cam arrangement 20 mounted on the base 16 provides for angular adjustment of the tubular holder 12 at the fishing position to accommodate fishing rod handles of varying shape, length and frictional characteristics, as well as personal preference as to angle of elevation.

The base 16 as illustrated includes an inverted L-shaped box channel member 22 having a vertical leg 24 and a horizontal leg 26 which meet at an elbow 28. The vertical leg 24 is shown provided with a fastener 30 by which the base may be mounted upon a boat transom or gunwale socket; or at a fishing pier, etc., as is conventional.

The horizontal leg 26 of the base 16 is shown provided with a vertical opening 32 near its outer, free end. One vertical side of the box channel constituting fixed part of the base is shown provided with a threaded opening 34 at the same distance from the elbow 28 as the opening 32. The opening 34 threadably receives a thumbscrew 36.

The base further includes an upwardly opening U-shaped channel 38 including a floor web 40 and two opposed sidewalls 42. A round pin 44 has its upper end secured to the opposed sidewalls 42. A round pin 44 has its upper end secured to the outside of the bottom of the U-shaped channel centrally of the floor web 40. The pin 44 is of a diameter to be rotatably, snugly received in the vertical opening 32. The pin 44 thus acts as a support and a horizontal angular adjustment means for the fishing rod holder, since the pin may be rotated about its own generally vertical, longitudinal axis and raised and lowered somewhat while the thumb screw 36 is in a loosened condition and then may be fixed at the desired location by tightening the thumbscrew 36.

At the upper rear of the sidewalls 42, a corresponding opening 46 is formed through each. Similarly, near the fore ends of the sidewalls 42 a corresponding opening 48 is formed through each.

The tubular holder 12 comprises a tube having an opening so formed diametrically therethrough near the rear end thereof.

The pivot arrangement 14 is constituted by a nut and bolt assembly 52 received through the base channel sidewall rear openings 46 and the tubular holder openings 50, pivoting the latter with respect to the former about a generally horizontal axis.

The eccentric cam arrangement 20 includes a generally cylindrical cam 54 having an offset axially directed opening 56 extending between the ends thereof. A bolt 58 received through the base channel sidewall fore openings 48 also mounts the cam 54 by proceeding through the offset opening 56, the cam 54 being received between the sidewalls 42 above the floor web 40. A thumbscrew 60 threadably received on the threaded end of the bolt 58 may be tightened to lock the cam at any desired angular orientation with respect to the generally horizontal axis of the bolt 58.

As shown in FIG. 2, the relative vertical positions of the tube 12 mounting at 52 and its point of rest upon the outer surface 64 of the cam are such that even when the upper extent of the surface 64 is at its lowest, the tubular holder 12 is supported in forwardly, upwardly tilted orientation of e.g., 5°. At an opposite extreme depicted in FIG. 3, the cam has been rotated to a point where its surface 64 at the place of its contact with the tube 12 is at its highest. In the embodiment shown, this produces about a 30° tilt of tube 12. The diameter and degree of eccentricity of the cam, the extent of the difference in level of the bolts 52 and 58 and their distance apart control the magnitude of tilt at and between the extremes of orientation of the cam.

In use, the fisherman slides the handle of his fishing rod R into the tube fore end, handle end first, until most of the handle is received in the tube 12. He then adjusts the angular orientation of the cam 54 to produce a desired tilt of the fishing rod and to wedge the rod handle in the tube 12 by virtue of canting of the essentially cantilevered rod with respect to the tube 12. The base may be adjusted at 36 if desired and the device 10 is ready for fishing.

To secure a release of the fishing rod, all the fisherman need do is lift upwardly on the rod. This will cancel its canting with respect to the tube 12 and permit it to be slid from the tube. If desired, the fisherman may pivot the tube up to a vertical position, then slide the rod handle from the tube.

In practice, the canting of the handle with respect to the tube and the upward tilt of the tube prevent fish from pulling the rod from the tube. Frictional grip of the rod handle is assisted by the fact that the handle is usually made of cork or the like.

The tube 12 and cam 54 are preferably made of tough synthetic plastic material. Other parts of the device 10 are preferably metallic, for instance, of aluminum, but could also be made of other materials such as tough synthetic plastic material.

It should now be apparent that the fishing rod holder as described hereinabove possesses each of the attributes set forth in the specification under the heading "Summary of the Invention" hereinbefore. Because the fishing rod holder of the invention can be modified to some extent without departing from the principles of the invention as they have been outlined and explained in this specification, the present invention should be understood as encompassing all such modifications as are within the spirit and scope of the following claims.

What is claimed is:

1. A fishing rod holder comprising:
    a tube adapted to receive the handle end of a fishing rod;
    a base comprising an upwardly opening U-shaped channel member having a bottom and two opposed, upstanding sidewalls;
    means pivotally securing the rear of said tube to the rear of said two sidewalls for pivotal movement of said tube about a generally horizontal axis between said two sidewalls;
    an eccentric cam received between said two sidewalls at a location spaced forwardly of said pivotally securing means, said tube resting on said cam;
    adjustable means mounting said cam with respect to said two sidewalls and permitting angular rotation of said cam about a generally horizontal axis and fixation of said cam for selecting and fixing the degree of tilt of said tube; the orientation and relative location of said eccentric cam and said pivotally securing means being such that said tube is always tilted upwardly;
    the eccentric cam being a generally cylindrical body having an outer cam surface with means defining an offset axial opening therethrough; said adjustable mounting means comprising means defining an opening through each of said two sidewalls; a bolt received through said sidewall openings and through the offset axial opening in said cam; and a fastener threadably secured on said bolt;
    further comprising a fixed base portion for mounting the tubular fishing rod holder; a generally vertical pin secured at its upper end to the outside of the bottom of said U-shaped channel member; means defining an opening in said fixed base portion; said pin being received in the last-mentioned opening; and means for adjustably securing said pin in said last-mentioned opening, whereby the vertical and horizontal-angular position of said U-shaped channel member with respect to said fixed base portion may be adjusted.

* * * * *